(12) United States Patent
Saunders et al.

(10) Patent No.: US 6,529,555 B1
(45) Date of Patent: Mar. 4, 2003

(54) SIGNAL PROCESSOR

(75) Inventors: Nicholas Ian Saunders, Basingstoke (GB); Robert Mark Stefan Porter, Maidenhead (GB); James Edward Burns, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 222 days.

(21) Appl. No.: 09/645,830

(22) Filed: Aug. 25, 2000

(30) Foreign Application Priority Data

Aug. 26, 1999 (GB) .............................................. 9920276

(51) Int. Cl.$^7$ ................................................. H04N 7/12
(52) U.S. Cl. ...................... 375/240.26; 386/52; 348/705
(58) Field of Search ...................... 386/52, 55; 348/705, 348/571, 413.1, 425.1; 375/240.01, 240.16, 240.26; H04N 7/12

(56) References Cited

U.S. PATENT DOCUMENTS

| 5,418,658 | A | 5/1995 | Kwon | |
|---|---|---|---|---|
| 6,393,057 | B1 | * 5/2002 | Thoreau et al. | ............. 375/240 |
| 6,400,886 | B1 | * 6/2002 | Brewer et al. | ............. 386/111 |
| 2001/0017593 | A1 | * 8/2001 | Saunders et al. | ............. 341/50 |

FOREIGN PATENT DOCUMENTS

| GB | 2 307 613 | 5/1997 |
|---|---|---|
| GB | 2 327 548 | 1/1999 |
| WO | 98/44737 | 10/1998 |

OTHER PUBLICATIONS

Hurst et al, MPEG Splicing, Nov. 1997, Tutorial and Proposed STPTE Standard, pp. 105–117.*

P.J. Brightwell, et al., "Flexible Switching and Editing of MPEG–2 Video Bitstreams", IBC—International Broadcasting Convention (Conf. Publ. No. 447), Proceedings of International Broadcasting Conference, Amsterdam, Netherlands, Sep. 12–16, 1997, pp. 547–522, XP002149973.

* cited by examiner

Primary Examiner—Nhon Diep
(74) Attorney, Agent, or Firm—Frommer Lawrence & Haug LLP; William S. Frommer

(57) ABSTRACT

Decoders A and B decode MPEG-2 bitstreams $A_O$ and $B_O$ and re-encoders 8 and 10 re-encode them as bitstreams $A_I$ and $B_I$ comprising only I frames. A switch (S1) switches from recoded stream $A_I$ to recoded stream $B_I$ to achieve a splice $A_I/B_I$. The spliced bitstream is stored in an I-frame store (12). The stored bitstream $A_I/B_I$ is re-encoded in an encoder 4. A new transitional GOP is defined beginning at the splice. The new GOP is defined by picture type decision rules which may change the length of the transitional GOP compared to the GOPs of streams A and B. The transitional GOP provides a prediction of the position in stream B where the occupancy value of stream C should coincide with that of B. A target for the new number of bits in the new GOP is calculated dependent on the difference between the occupancy value of stream C at the splice and a prediction of the occupancy of stream B at the predicted position. The occupancy value of stream C is controlled in accordance with the target so that it tends towards the occupancy value of stream B at the predicted position. In another version, the target is updated at regular intervals throughout the GOP, and the change allowed is limited.

26 Claims, 13 Drawing Sheets

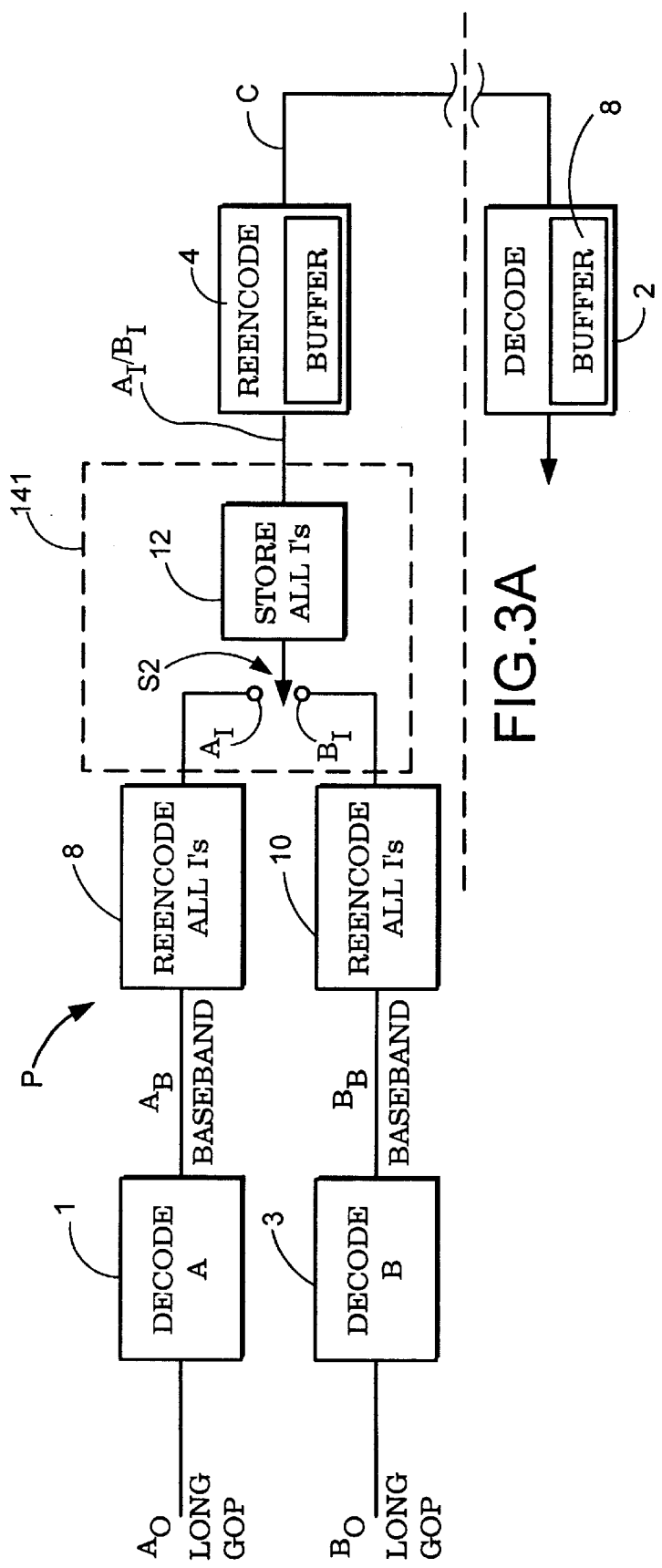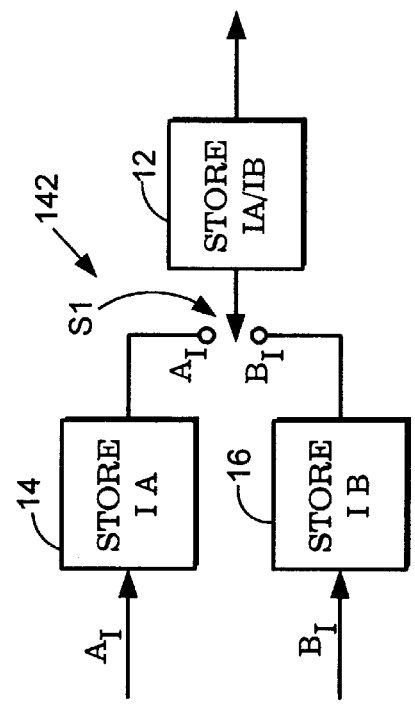
FIG.3A
FIG.3B

FIG. 4A

DISPLAY ORDER, SHOWING PICTURE TYPE DECISIONS

| FRAME No.: | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| STREAM $A_0$: | B | B | I | B | B | P | B | B | P | B | B | P | B | B | I | B | B | P | B | B | P | B | B | P |
| STREAM $B_0$: |   | · | B | I | B | B | P | B | B | I | B | B | P | B | B | I | B | B | P | B | B | P | B | B |
| STREAM C:   | B | B | I | B | B | P | B | B | P | B | B | I | B | B | I | B | B | P | B | B | P | B | B | P |
| STREAM C':  | B | B | I | B | B | P | B | B | P | B | B | I | B | B | I | B | B | P | B | B | P | B | B | P |

FIG. 4B

| FRAME No.: | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|---|---|---|---|---|---|---|---|
| STREAM $A_0$: | B | B | I | B | B | (P | B | B | P | B | B | P | B | B | I | B | B | P | B | B | P | B | B | P) |
| STREAM $B_0$: | B | P | B | B | I | B | B | P | B | B | I | B | B | P | B | B | I | B | B | P | B | B | P | B |
| STREAM C:   | B | B | I | B | B | B | B | P | B | B | I | B | B | P | B | B | I | B | B | P | B | B | P | B |
| STREAM C':  | B | B | P | B | P | B | B | P | B | B | P | B | B | P | B | B | P | B | B | P | B | B | P | B |

SPLICE POINT (between frames 28 and 29)

(1)    (2)    (3)    (4)

| | FIG. 4A |
|---|---|
| FIG. 4 | FIG. 4B |

FIG. 4B

| FRAME No.: | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 |
|---|---|---|---|---|---|---|---|---|---|---|---|---|---|---|---|---|---|---|---|---|---|---|---|---|
| (STREAM $A_0$: | B | B | I | B | B | B | P | B | B | P | B | B | B | B | P | B | B | I | B | B | B | B | B | P) |
| STREAM $B_0$: | B | P | B | B | I | B | P | B | B | P | B | B | I | B | B | B | P | B | B | P | B | B | P | B |
| STREAM C: | B | B | B | B | B | B | B | B | B | B | B | B | B | B | B | I | B | B | B | B | P | B | B | B |
| STREAM C': | B | B | P | B | P | B | I | B | B | P | B | B | P | B | B | P | B | B | P | B | B | P | B | B |
| | | | | | *|*|*|*|*|*|*|*|*|*|*| | | | | | | | | |
| | | | | | VBV LOCK | | | | | | | | | | | | | | | | | | | |

| FRAME No.: | 72 | 73 |
|---|---|---|
| STREAM $A_0$: | • | • |
| STREAM $B_0$: | B | P |
| STREAM C: | B | P |
| STREAM C': | B | P |

- = REUSE
* = RECODE (TRANSITION PERIOD)

STREAM C' = FINAL STREAM C (AFTER PICTURE TYPE DECISIONS)
(1), (2), (3), (4) = PICTURE TYPE DECISIONS MADE AT THESE FRAMES

FIG.5

| FIG.5A |
|--------|
| FIG.5B |

FIG.5A

PROCESSING ORDER, AS SHOWN ON VBV OCCUPANCY GRAPHS

| FRAME No.: | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| STREAM A: | I | B | B | P | B | B | P | B | B | P | B | B | P | B | B | I | B | B | P | B | B | P | B | B |
| STREAM B: | • | • | I | B | B | P | B | B | P | B | B | B | B | I | B | B | P | B | B | P | B | B | P | B |
| STREAM C': | I | B | B | P | B | B | P | B | B | P | B | B | P | B | B | I | B | B · B | P | B | B | P | B | B |

| DISP C': | 2 | 0 | 1 | 5 | 3 | 4 | 8 | 6 | 7 | 11 | 9 | 10 | 14 | 12 | 13 | 17 | 15 | 16 | 20 | 18 | 19 | 23 | 21 | 22 |

SPLICE POINT

| FRAME No.:| 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|---|---|---|---|---|---|---|---|
| STREAM A: | I | B | B | P | B | B | (B | B | P | B | B | P | B | B | I | B | B | P | B | B | P | B | B | B) |
| STREAM B: | B | B | I | B | B' | B' | P | B | B | P | B | B | I | B | B | P | B | B | P | B | B | P | B | B |
| STREAM C':| P | B | B | P | B' | B' | I | B | B | P | B | B | I | B | B | P | B | B | P | B | B | P | B | B |

| DISP C': | 26 | 24 | 25 | 28 | 27' | 31 | 29 | 30 | 34 | 32 | 33 | 37 | 35 | 36 | 40 | 38 | 39 | 43 | 41 | 42 | 46 | 44 | 45 | 49 |

FIG. 5B

| FRAME No.: | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 |
|---|---|---|---|---|---|---|---|---|---|---|---|---|---|---|---|---|---|---|---|---|---|---|---|---|
| STREAM A | (I | B | B | P | B | B | P | B | B | P | B | B | I | B | B | P | B | B | P | B | B | P | B | B) |
| STREAM B | : | B | B | I | B | B | P | B | B | P | B | B | I | B | B | P | B | B | P | B | B | P | B | B |
| STREAM C' | : | B | B | I | B | B | P | B | B | P | B | B | I | B | B | P | B | B | P | B | B | P | B | B |
|  | **** | * | —— | —— | —— | ***** | * | —— | —— | —— | —— | —— | —— | —— | —— | —— | —— | —— | —— | —— | —— | —— | —— | —— |
| DISP C' | : 47 | 48 | 52 | 50 | 51 | 55 | 53 | 54 | 58 | 56 | 57 | 61 | 59 | 60 | 64 | 62 | 63 | 67 | 65 | 66 | 70 | 68 | 69 | 73 |

VBV LOCK

| FRAME No.: | 72 | 73 |
|---|---|---|
| STREAM A : | • | • |
| STREAM B : | B | B |
| STREAM C' : | B | B |
|  | —— | —— |
| DISP C : | 71 | 72 |

– = REUSE
* = RECODE (TRANSITION PERIOD)

FRAME No. = PROCESSING ORDER FRAME No.
DISP C' = DISPLAY ORDER FRAME No. FOR STREAM C

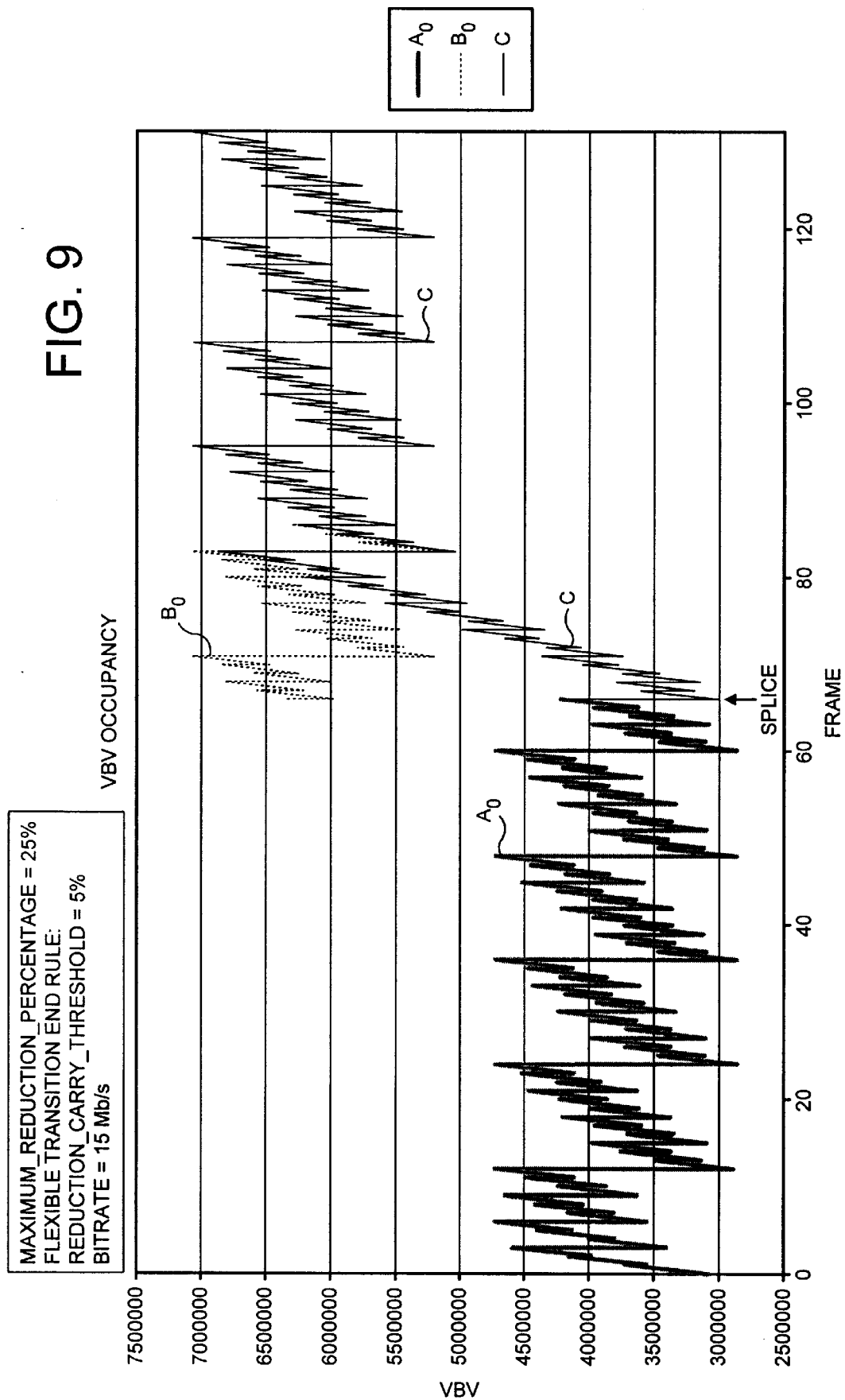

SIGNAL PROCESSOR

BACKGROUND OF THE INVENTION

1. Field of the Invention

The present invention relates to a signal processor. The invention concerns joining, referred to herein as splicing, digital bit streams which are compressed. Embodiments of the invention described herein are concerned with splicing digital video bitstreams which are compressed according to the MPEG-2 standard.

2. Description of the Prior Art

The invention and its background will be discussed by way of example with reference to MPEG-2 video bitstreams. However the invention is not limited to MPEG-2.

MPEG-2 is well known from for example ISO/IEC/ 13818-2, and will not be described in detail herein. Splicing of video is well known. Splicing analogue signals is relatively straight forward and can be done at the boundary between adjacent frames, because each analogue frame contains the whole of the video information of that frame independently of other frames. Splicing can be done similarly in the digital domain for both compressed and uncompressed video data if all frames contain the whole video information of the frame.

MPEG-2 compressed video comprises groups of I, P and/or B frames known as GOPs, Groups of Pictures. I, P and B frames are well known. An I or Intra-encoded frame contains all the information of the frame independently of any other frame. A P frame in a GOP ultimately depends on an I frame and may depend on other P frames. A B frame of a GOP ultimately depends on an I-frame and may depend on P frames in the GOP. A B frame must not depend on another B frame.

A GOP typically comprises 12 or 15 frames comprising at least one I frame and several P and B frames. To correctly decode a GOP requires all the frames of the GOP, because a large part of the video information required to decode a B frame in the GOP is in a preceding and/or succeeding frame of the GOP. Likewise a large part of the video information required to decode a P frame is in a preceding frame of the GOP.

Thus if two different bit streams are spliced together in the compressed domain, the information necessary to decode frames each side of the splice point is likely to be lost.

Many papers have been written concerning the splicing of compressed bitstreams, which is a well known problem in MPEG. A paper "Flexible Switching and editing of MPEG-2 Video Bitstreams" by P. J. Brightwell, S. J. Dancer and M. J. Knee was published in "Atlantic Technical Papers 1996/ 1997" the preface to which is dated September 1997.

The paper discusses the problems of splicing MPEG-2 Video Bitstreams. Two bitstreams A and B to be spliced are decoded in respective decoders. A coder is switched from the decoder of A to the decoder of B at the splicing point. It discloses that near a splicing point where a bitstream A is replaced by a bitstream B, the following modifications are made. "The picture type may be changed to provide a more suitable refresh strategy around the switch point. In the example below, the first P-frame in bitstream B after the switch is converted to an I-frame to provide a full refresh early in the new scene. Also, bitstream A contains an I-frame just before the switch point—as this is unnecessary, it is recoded as a P-frame to save bits.

|             |   |   |   |   | Switch point |   |   |   |   |   |   |   |
|-------------|---|---|---|---|---|---|---|---|---|---|---|---|
| bitstream A: | P | B | B | I | — |   |   |   |   |   |   |   |
| bitstream B: |   |   |   | — | B | P | B | B | P | B | B | P |
| modified    | P | B | B | P | B | I | B | B | P | B | B | P |

Prediction modes and motion vectors may require modification to take into account any changes in the picture type on recoding, or to prevent any predictions being made across the switch on recoding. In the example above, macroblocks that originally used forward or bi-directional prediction for the B-frame following the switch point will be recoded using intra mode and backward prediction respectively. In addition, vectors are required for the I-frame that is recoded as a P-frame—these can be estimated from the vectors in surrounding frames, or taken from I-frame concealment vectors that many MPEG-2 bitstreams carry.

The quantisation parameters will be changed as part of the recoder's rate control strategy. As in a conventional coder, this aims to control the buffer trajectory of a downstream decoder to prevent under- or overflow, and to maintain the picture quality as high as possible. In addition, the rate control algorithm for the ATLANTIC switch uses the vbv_ delay values in bitstreams A an B (which are carried in the info-bus) to make the buffer trajectory for the switched bitstream identical to that for bitstream B (i.e. the one being switched to) at some future time. Depending on the relative vbv_delay values, this may happen soon after the switch, or a recovery period of a few GOPs may be required. When it has been achieved, the recoder's quantisation parameters are locked to those of bitstream B, and the switch becomes transparent.

The quantisation parameters may also be changed to take advantage of effect know as temporal masking. This refers to the eye's inability to see moderate or even large amounts of noise around a scene change—typically 5 dB of degradation in the frame after the switch cannot be seen—and allows the number of bits used for the frames very close to the switch point to be reduced, allowing a shorter recovery period."

"Vbv-delay values" are measures of the number of bits in the buffer of the down stream decoder. The manner in which the "buffer trajectory" for the switched bitstream is made identical to that for bitstream B is not disclosed in the paper. Also the time scale over which that happens may be "soon after the switch" or after a few GOPs.

As mentioned above, splicing can be done in the digital domain for a compressed bitstream if all frames contain the whole video information of the frame. Thus for MPEG, it has been proposed to edit compressed bitstreams containing only I frames: that is becoming standard practice in studios for ease of editing.

The present invention proposes converting two bit streams to be spliced, and comprising for example GOPs of 12 or 15 frames, to all I-frames, splicing the I-frames of the two bitstreams; and then re-encoding the spliced bitstreams as GOPs of I and P and/or B frames.

Converting all frames whether I, P and/or B to I frames for splicing and reconverting them to I, P and B frames after splicing results in a loss of picture quality.

It is desired to maintain picture quality as high as possible.

SUMMARY OF THE INVENTION

In accordance with the present invention, there is provided a signal processor for splicing a compressed video bitstream $A_0$ to a compressed video bitstream $B_0$ to form a compressed bitstream C, the bitstreams $A_0$, $B_0$ and C having GOPs including I frames and P and/or B frames, the processing comprising first and second inputs ($A_0$, $B_0$) for receiving the bitstreams $A_0$ and $B_0$ respectively, first means for re-encoding the GOPs of the bitstreams $A_0$ and $B_0$, re-encoded bitstreams $A_I$ and $B_I$, respectively having GOPs including only I frames, the transcoding parameters of the frames of the bitstreams $A_0$ and $B_0$ being retained unchanged in association with the corresponding I frames of the bitstreams $A_I$ and $B_I$, means for splicing bitstream $B_I$ to bitstream $A_I$ at a splice point (SPLICE), to produce a spliced I-frame bitstream, ($A_I/B_I$)

second means for re-encoding the spliced I-frame bitstream ($A_I/B_I$) as the compressed bitstream for supply to a downstream decoder having a downstream buffer wherein the value of occupancy of the downstream buffer by the bitstream C is controlled over a transition region having a transitional GOP including the splice point (SPLICE) so that the said value of occupancy changes over the duration of the transition region from that of stream $A_0$ to that of stream $B_0$, and wherein the frames of the bitstream $A_I$ before the transition region are re-encoded re-using the transcoding parameters of the corresponding frames of the bitstream $A_0$, and the frames of the bitstream $B_I$ after the transition region are re-encoded re-using the transcoding parameters of the corresponding frames of the bitstreams $B_0$.

By reusing the encoding parameters of the frames before and after the transition region (which includes the splice point), reduction of picture quality is minimised. However, due to differences in vbv. occupancy of the original bitstreams $A_0$ and $B_0$, the downstream buffer may over- or under-flow. By controlling the occupancy of the spliced bitstream in the transition region over- or under-flow of the down stream buffer is avoided.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 3A is a schematic block diagram of an illustrative signal processor according to the present invention;

FIG. 3B shows a modification of FIG. 3A;

FIG. 4 shows illustrative GOPs in display order and the application of illustrative picture type decisions;

FIG. 5 shows the GOPs of FIG. 4 in processing order;

FIG. 9 shows illustrative values of VBV occupancy for the GOPs of FIG. 4 for a further embodiment of the invention.

DESCRIPTION OF THE PREFERRED EMBODIMENTS

Transcoding Parameters

I frames have the following transcoding parameters which are well known in MPEG.

DCT_Type, Q and Q_Matrix which are reused in embodiments of the present invention described hereinbelow. These parameters are reused in the recoding of I frames with reuse of parameters.

P and B frames have the parameters DCT_Type, Q, Q_Matrix, Pred_Type, MB_Mode and Motion Vectors. These parameters are reused in the recoding of P and B frames with reuse of parameters. These parameters are recalculated when fully recoding all frames.

Overview

Figure 1:
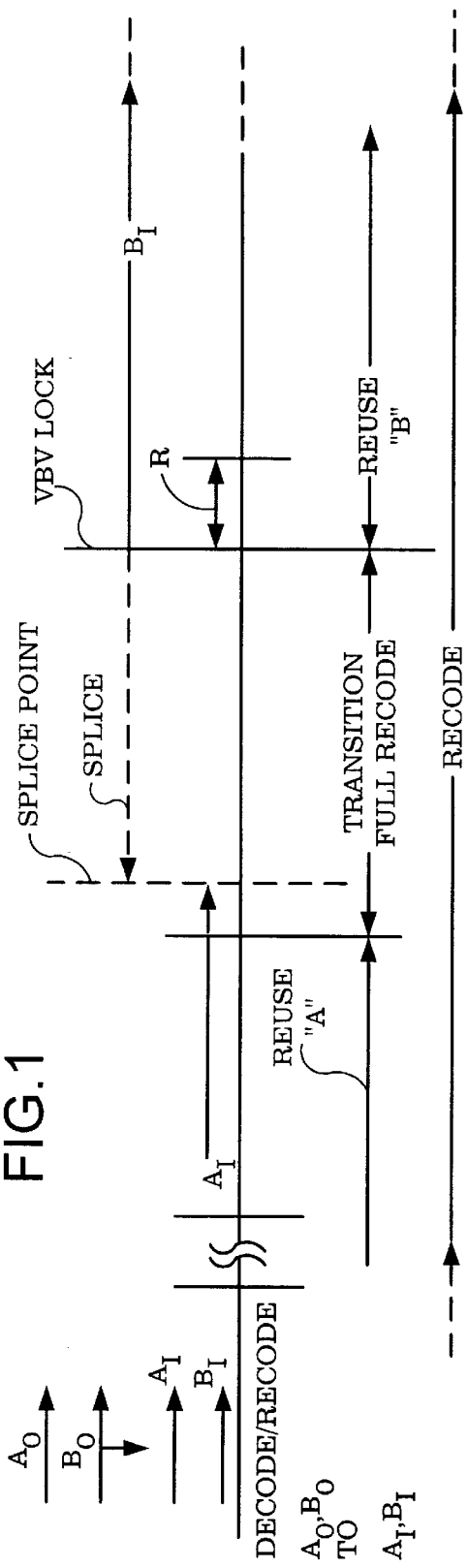
FIG. 1 is a time chart illustrating the splicing of a bitstream $B_0$ to a bitstream $A_0$ in accordance with an example of the present invention.
Figure 2:
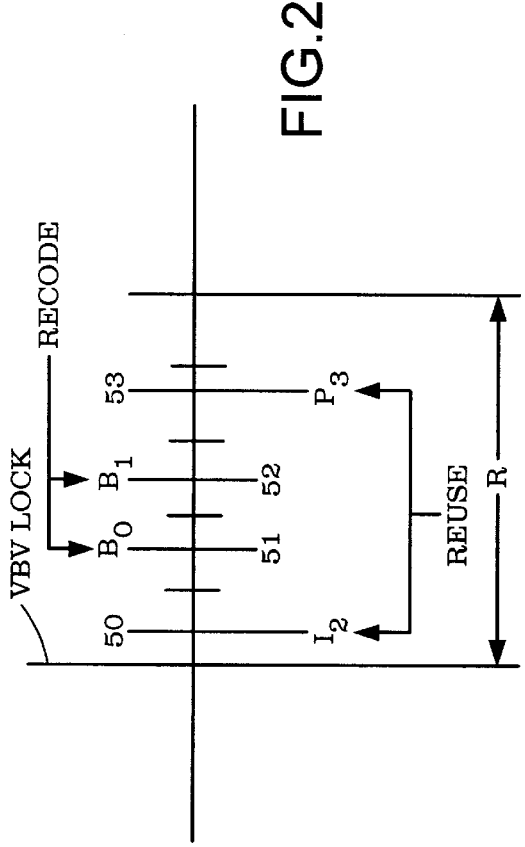
FIG. 2 illustrates a portion R of the chart of FIG. 1 in more detail.

Referring to FIGS. 1, 3A and 4, two bitstreams $A_0$ and $B_0$ are MPEG-2 encoded with GOPs comprising 12 frames. In this example the bitstreams $A_0$ and $B_0$ have the same GOP structure:

IBBPBBPBBPBB as shown in FIG. 4. However the bitstreams may have any other GOP structure allowed by MPEG-2. The two bitstreams $A_0$ and $B_0$ may have different GOP structures. For ease of explanation it is assumed the bitstreams $A_0$ and $B_0$ have the same GOP structure as shown in FIG. 4.

It is desired to replace bitstream $A_0$ by bitstream $B_0$. As shown in FIGS. 1 and 3A, initially $A_0$ and $B_0$ are decoded. When decoding and recoding $A_0$ and $B_0$ as $A_I$ and $B_I$, the MPEG parameters of all frames of the original bitstreams $A_0$ and $B_0$ are retained in association with the recoded corresponding frames of $A_I$ and $B_I$. I frames of $A_0$ and $B_0$ are recoded as I frames of the bitstreams $A_I$ and $B_I$. using the same transcoding parameters they had in $A_0$ and $B_0$. P and B frames of $A_0$ and $B_0$ are recoded as I frames in $A_I$, and $B_I$. but their original MPEG parameters are retained. The MPEG parameters are retained in the recoded bitstream $A_I$, $B_I$. as, for example, user data.

When an operator decides to splice the recoded bitstreams $B_I$, and $A_I$, the operator operates the switch S1 so that $A_I$ is routed to a store 12 up to the splice point and $B_I$, is routed to the store 12 after the splice point, so that store 12 stores a spliced bitstream $A_I/B_I$ with a splice point between a frame of $A_I$ and a frame of $B_I$.

The spliced bitstream $A_I/B_I$ is decoded to base band and re-encoded in an encoder 4 as a GOP C of the form shown in FIG. 4.

In a preferred embodiment shown in FIG. 3B the bitstreams are stored in respective stores 14 and 16 upstream of the switch S1 before they are spliced. The spliced bitstream $A_I/B_I$ is stored in another store 12. The stores 14, 16 and 12 may be digital Video Tape Recorders, I-frame servers and/or disc recorders for example. Currently suitable VTRs operate at a data transfer rate of 50 Mbit/sec for compatibility with I-frames.

Referring to FIG. 1 the splice point SPLICE is indicated. At the splice point switch S1 switches from, for example, bitstream $A_I$ to bitstream $B_I$. When the spliced bitstreams are to be re-encoded they are fed to the encoder 4. In the example of FIGS. 1 and 4, full recoding, that is without re-use of the MPEG parameters, takes place in a transition region beginning on the bitstream $A_I$ 5 frames before the splice point SPLICE. The reason for this will be explained below.

Before the beginning of the transition region (i.e. more than 5 frames before SPLICE) the bitstream $A_I$ is recoded reusing the MPEG parameters derived from the original bitstream $A_0$.

After the splice point SPLICE, the bitstream $B_I$ is fully recoded for the remainder of the transition period during which VBV_lock is achieved as will be explained below. Once VBV_lock is achieved, recoding of bitstream $B_I$ continues but with re-use of the MPEG parameters derived from the original bitstream $B_O$.

The spliced and recoded bitstream C produced by processor P and encoder 4 are fed to a downstream decoder 2 where the bitstream C is decoded for display for example. Downstream decoder 2 may be in, for example, a domestic television receiver. Processor P may be in a studio.

In FIGS. 3A and 3B the spliced bitstream $A_I/B_I$ is stored in the I-frame store 12 before being recoded. A marker marking the splice point is recorded in the bitstream, for example in the user bits.

Temporal Reference

A temporal reference, as known in MPEG, is a reference which increments on every frame from a GOP header. There is usually one GOP header per GOP, and the temporal reference increments on each frame of the GOP. Alternatively, there is a header at the head of a sequence of GOPs and the temporal reference increments from that header once per frame. This allows the positions of frames in a GOP to be tracked. The temporal references for the GOPs of bitstreams A0 and B0 are retained in the I-frame bitstreams $A_I$ and $B_I$.

Picture Type Decisions

In the transition region shown in FIG. 1, the following picture type decision rules are applied. The rules are applied to the recoding of the I frames $A_I$ and $B_I$ and define the frame types to which the I frames are re-encoded. The decisions are made on the basis of the frame type the I frame in question had in the original bitstream $A_O$ or $B_O$. That information is preserved in the bitstream with the I frames of bitstreams $A_I$ and $B_I$.

Thus an I frame of bitstream $A_I$ is referred to as its former type e.g. $I_0$, $P_0$ or $B_0$ as shown in FIG. 4.

The bit stream, in this example $A_I$, before the splice, is recoded so that:

(1) the two '$I_0$' or '$P_0$' frames before the splice are converted to 'P';

(2) if the last frame before the splice is a '$B_0$' frame, it is converted to 'P'.

The bitstream, in this example $B_I$, after the splice is recoded so that:

(3) the first '$I_0$' or '$P_0$' frame after a splice is converted to 'I'; and (4) if the first GOP after the splice and after the application of rule (3) contains less than three 'P' frames, the first '$I_0$' frame of the subsequent GOP is converted to 'P', thereby lengthening the GOP.

A new transitional GOP begins with an I-frame at the splice, and the new GOP may be different in length than the preceding (and succeeding) GOPs in the bitstream $B_O$. The new GOP is in effect a prediction of where VBV_lock is to be achieved. The application of these rules is shown in FIG. 4 at (1), (2), (3) and (4).

In FIG. 4

A is bitstream $A_O$ (before recoding as all I frames $A_I$),

B is bitstream $B_O$ (before recoding as all I frames $B_I$),

C is the spliced bitstream (after recoding of all the I frames of the spliced bitstream $A_I/B_I$ at output C of encoder 4) as if the picture type decisions have not been made, and $C^1$ is the spliced bitstream at output C of encoder 4 with the picture type decisions applied to it.

By application of rule (2), the '$B_0$' frame of $A_I$ immediately before the splice is converted to P. By application of rule (1) the $I_0$ frame of $A_I$ before the splice is also converted to P.

By application of rule (3), the first '$P_0$' frame of stream $B_I$ after the splice is converted to I in stream $C^1$.

By application of rule (4), the GOP of bitstream $B_I$ after the splice has (after conversion of its first P frame to I) less than 3 '$P_0$' frames. Therefore the next '$I_0$' frame is converted to 'P'. Application of these rules gives a GOP which defines a predicted VBV_lock point as will be discussed below.

Processing Order

FIG. 4 shows the frames of the bitstreams in the order in which they are displayed or would be displayed. FIG. 5 shows the order in which the frames are processed. For example, referring to FIG. 4 (Display Order) frame 0, 1 and 2 of bitstream $A_O$ are shown in that order. Even though the B frames 0 and 1 would be displayed before I frame 2, they depend on I frame 2 to be decoded. Thus to decode them I frame 2 must precede the B frames as shown in FIG. 5. Likewise B frames 3 and 4 of FIG. 4 depend on P frame 5 of FIG. 4; thus in FIG. 5 P frame 5 of FIG. 4 becomes P frame 3 preceding the two B frames.

Constant bit rate

The example of the processor P of FIG. 3A or 3B, has a constant bit rate. The bitstreams $A_O$ $B_O$, have a fixed bit rate and the encoder 4 produces at output C of encoder 4 a constant bit rate.

Downstream Decoder and Buffer

Figure 6:
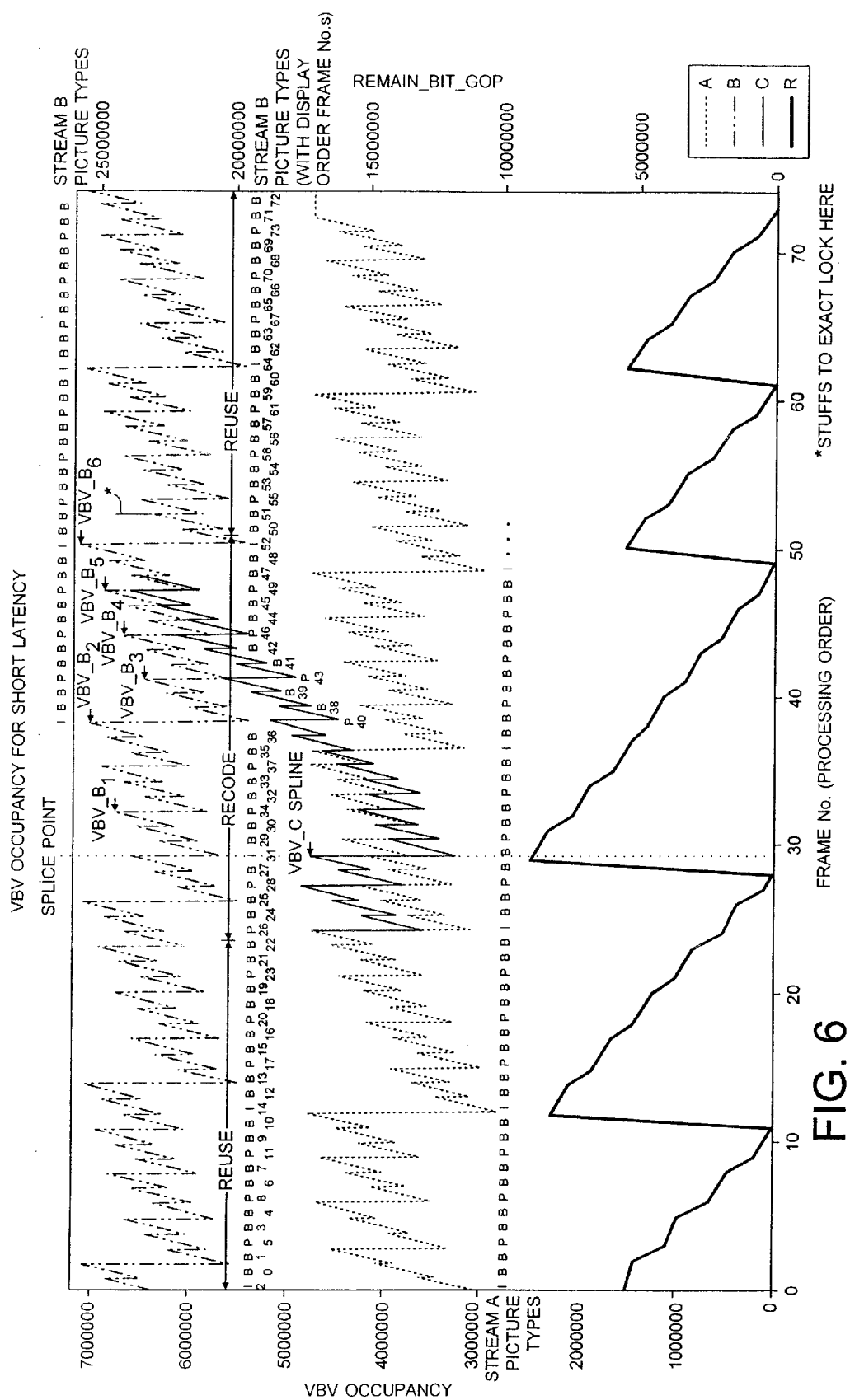
FIGS. 6 and 7 both show illustrative values of VBV occupancy and remain bit-GOP for the GOPs of FIG. 4 for one embodiment of the invention.
Figure 7:
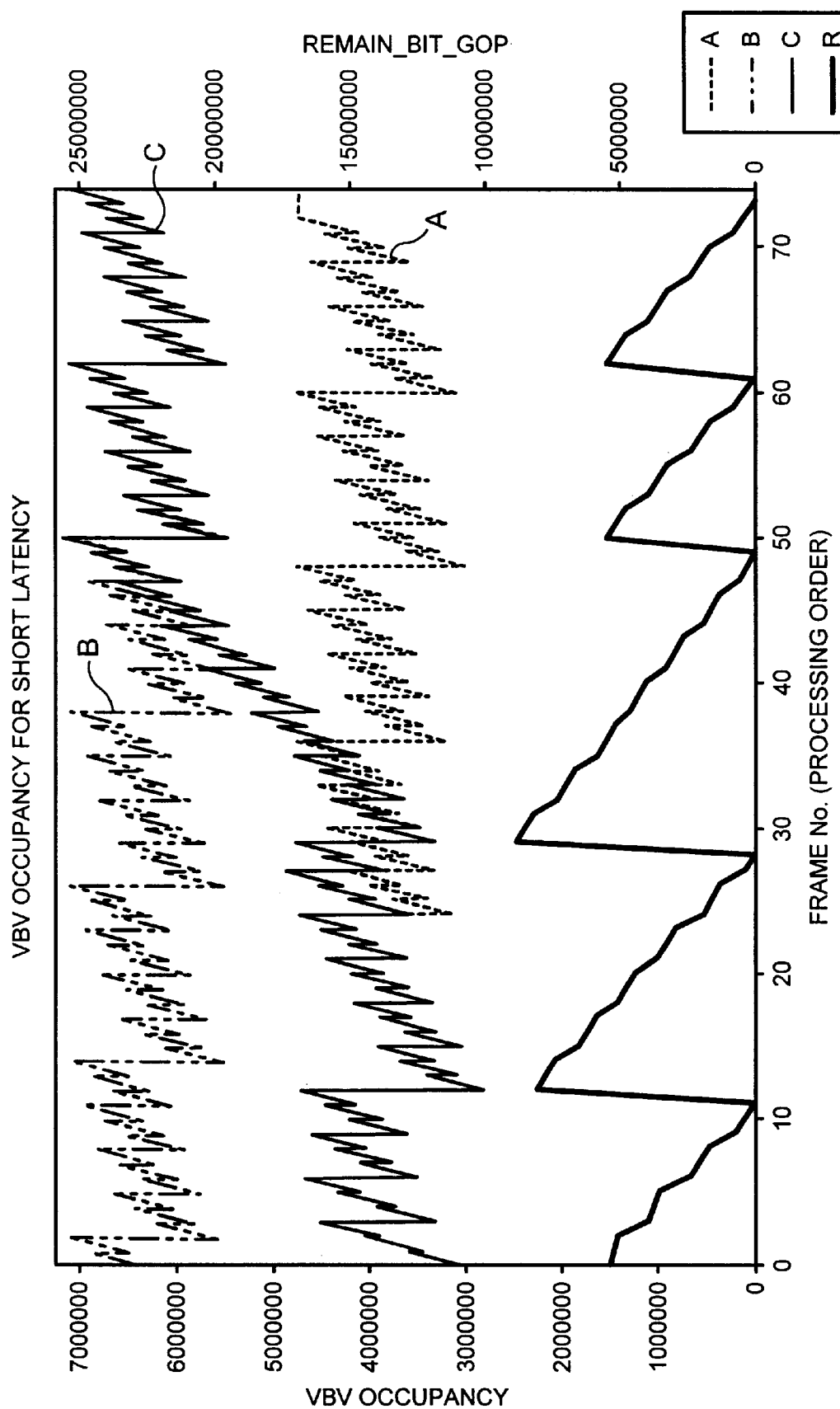
Figure 8:
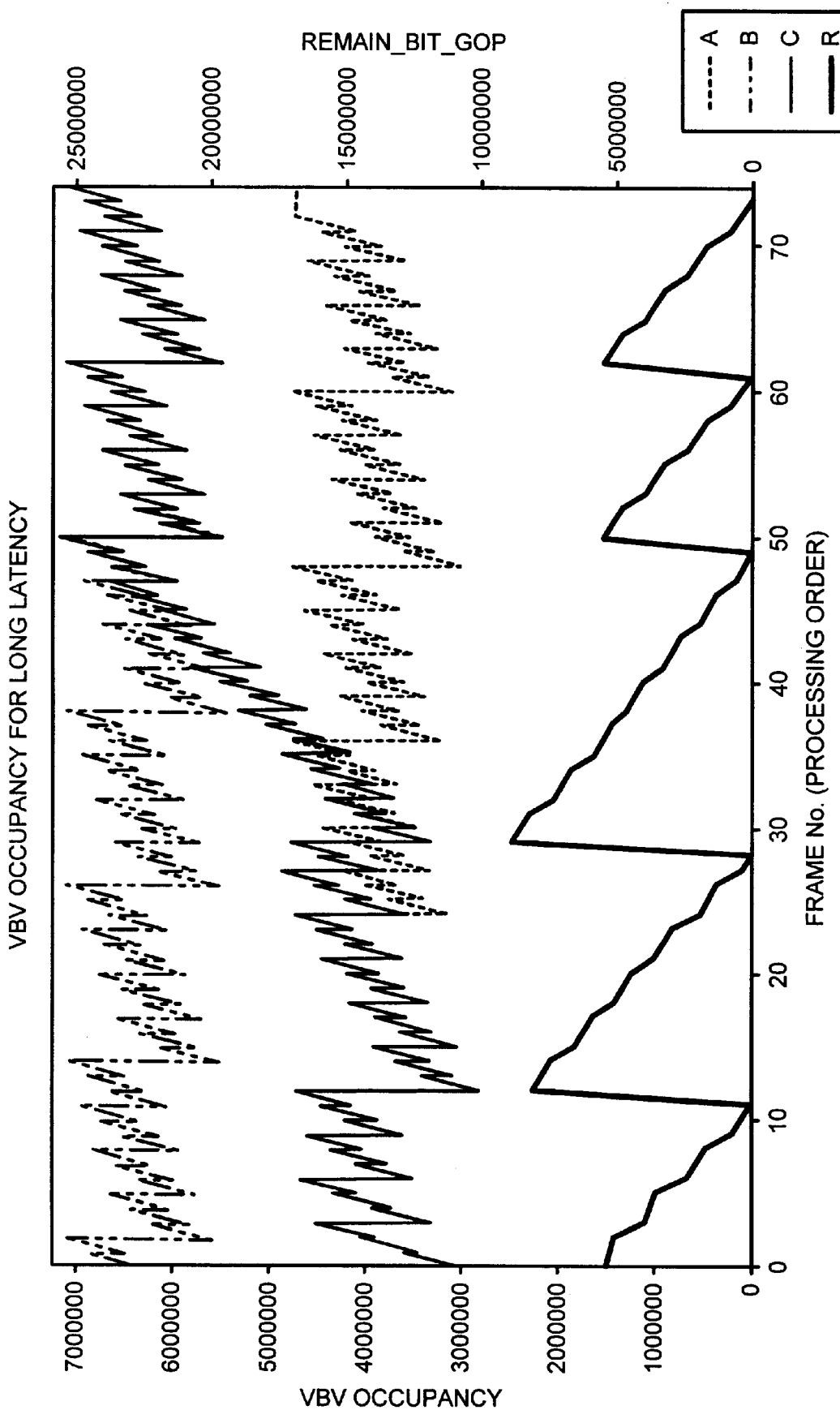
FIG. 8 shows illustrative values of VBV occupancy and remainder-bit-GOP for the GOPs of FIG. 4 for another embodiment of the invention.

The downstream decoder 2 has a buffer 8. The encoding which takes place in encoder 4 of the processor is arranged so that the buffer 8 of the downstream decoder 2 neither underflows nor overflows. FIGS. 6, 7 and 8 show the operation of the downstream buffer 8 of the downstream decoder 2.

(The encoder 4 has a corresponding buffer and it operates as the inverse of what is shown in FIGS. 6, 7 and 8.)

The following are known MPEG rate control parameters.

VBV

VBV is virtual buffer verifier. It is a measure of the number of bits that would be in the downstream buffer 8.

Remain_bit_GOP

At the beginning of a GOP it is a target for the whole GOP. This is a target number for the total number of bits for the remainder of the current GOP. It reduces as the GOP progresses.

Complexity X, constants Kp, Kb and N, Np, Nb

N is the number of pictures in a GOP.

Np is the number of P frames remaining in a GOP.

Nb is the number of B frames remaining in a GOP.

Kp and Kb are 'universal' estimates dependent on quantisation matrices. They (indirectly) define the relative sizes of I, P and B frames. Xi, Xp, Xb are "complexity measures" for I, P and B frames.

These parameters are used in a known manner to distribute the bits of a GOP amongst I, P and B frames.

They are further explained in "Test Model 5" published by "International Organisation for Standardisation Organisation Internationale De Normalisation Coded Representation of Picture and Audio Information ISO/IEC JTC1/SC29/WG11/N0400".

Achieving VBV_Lock

As discussed above, the downstream buffer must neither underflow nor overflow. In MPEG-2 the buffer is normally kept approximately half-full. A discontinuity in the bit stream can make the buffer underflow or overflow. VBV is the measure of buffer occupancy.

FIGS. 6, 7 and 8 show, as an extreme case, buffer occupancy VBV for two bitstreams $A_0$ and $B_0$. $A_0$ has a typical occupancy, and $B_0$ has unusually high occupancy. In the present embodiment of the invention, original bitstream $B_0$ recoded as $B_I$ is spliced into original bitstream $A_0$ recoded as $A_I$. The spliced $A_I/B_I$ bitstream is recoded using, outside the transition region, the original transcoding parameters, $Q^-$, DCT type, Q-matrix, Pred_type, MB_mode and Motion Vectors. Thus the bitstreams outside the transition region are recoded to the same form and thus approximately the same VBV as in their original forms $A_0$ $B_0$. The VBV values of the original bitstreams $A_0$ $B_0$ may be very different. Consequently, even though the bitstreams are recoded as all I frames as an intermediate step for editing, the VBV of the spliced bitstream has a discontinuity around the splice point. Thus FIGS. 6, 7 and 8 are illustrative of the VBV discontinuity encountered when splicing the I frame bitstreams $A_I$ and $B_I$ and recoding them as bitstream C.

In the situation where the bitstream begins with A with typical occupancy and B with high occupancy is spliced onto A at the splice point, it is necessary in the transition region to:

a) provide continuity, albeit changing, of VBV occupancy; and b) change the VBV occupancy from the value of stream A just before the splice to a target value which is the value of VBV for stream B.

As best shown in FIG. 7 or 8, the VBV of bit stream C begins identical to A, then changes progressively towards the VBV of B.

The point at which the VBV occupancy of C becomes identical to that of stream B is the VBV_lock point.

As mentioned above FIGS. 6, 7 and 8 show occupancy of the downstream buffer 8. To achieve VBV_lock the encoder 4 is controlled.

FIGS. 6 and 7 shows a second method of achieving VBV lock. FIG. 8 shows a first method which uses the first picture type decision rules set out above.

First Method (long latency)

The first method uses the picture type decision rules (1) to (4) above unchanged.

a) Adjust Remain_bit_GOP.

The length of the transitional GOP is known from the result of adjusting the GOP length using the picture decision rules.

The value of the Remain-bit-GOP is reset to zero at the splice point which is marked by the splice marker. The value of Remain-bit-GOP is recalculated in normal manner for the new GOP following the splice point, and a value Extra-bits is added to the result, where Extra-bits is

[$VBV\_C\_Splice - VBV\_B\_Lock$]

where VBV_C_Splice is VBV occupancy of stream C immediately before the splice which is always the end of the previous (adjusted) GOP because of the picture decision rules and VBV_B_Lock is the VBV occupancy of the stream B at the end of the new GOP. This value is known because the frames of the B stream are stored and the length of the new GOP is known.

Extra_bits can be negative.

The initial value of Remain-bit-GOP calculated in this way is reduced by a factor $\alpha$ where $\alpha$ is less than one. The factor $\alpha$ is chosen to reduce the value of Remain-bit-GOP by a small amount e.g. 5% or less so that spare bits allow additional bits ('stuffing' bits) to be added to achieve exact lock. The need for this will be explained below. The factor $\alpha$ is empirically determined. In the following discussion it is assumed to be fixed. However it may be varied.

b) Complexity

Stream A is decoded and re-encoded before the splice. Thus encoding occurs with complexity values appropriate to stream A. However, these values are not appropriate for stream B. Complexity values $X_i$, $X_p$, $X_B$ of the I, P and B frames of stream B are calculated based on $$X = S \cdot Q$$

where

X=complexity value

S=number of bits generated by encoding picture

Q=average quantisation parameter of all macroblocks in a picture.

$X = S \cdot Q$ is a standard equation for rate control in MPEG.

Because the bitstreams to be spliced $A_I$ and $B_I$ comprise only I-frames, the complexity estimates are derived as follows:

a) for P and B frames from the first generation transcoding parameters (which have been retained in association with the frames) of the I frames of the bitstream $B_I$ after the splice point; and b) for the I-frames from any I-frame of stream $B_I$ after the splice point. Preferably, the I-frame chosen is one which will be recoded as an I-frame in stream C.

These frames may be available at the splice point due to the 3-frame re-ordering delay. Otherwise a 3-frame delay may be provided.

At the splice point these complexity values replace the existing values (of stream A). So after the splice complexity values appropriate to stream B are used. In the present embodiment, where the initially spliced bitstream $A_I/B_I$ is stored in the I-frame store as I-frames, the values of complexity are derived from the bitstream $B_I$ after the splice point. They may be derived using a suitable delay. The delay may be inherent due to the delay required in re-ordering the frames.

The complexity values control the distribution of bits amongst I, P and B frames. Achieving good subjective quality is dependent on the complexity values.

c) Virtual Buffers Modification

The virtual buffers are used to calculate the reference Q scale for each macroblock. Improvement in quality can be gained by setting the virtual buffers to estimated stream B values at the splice point. This ensures that the resulting Q scales are similar to those used in stream B in the previous generation, instead of continuing with stream A Q scales.

Stream B virtual buffer values are estimated, and forced at the splice point.

For the I frame the value is calculated as:

$$\text{estimated\_buf}\_i = (Q^* \text{bit\_rate})/(31^* \text{frame\_rate}),$$

where Q is the average quantization parameter. The values for P and B frames are calculated similarly.

Because the bitstreams to be spliced $A_I$ and $B_I$. comprise only I-frames, the virtual buffer estimates are derived as follows:

a) for P and B frames from the first generation transcoding parameters (which have been retained in association with the frames) of the I frames of the bitstream $B_I$, after the splice point; and b) for the I-frames from any I-frame of stream $B_I$ after the splice point. Preferably, the I-frame chosen is one which will be recoded as an I-frame in stream C.

These frames may be available at the splice point due to the 3-frame re-ordering delay. Otherwise a 3-frame delay may be provided.

The encoding in encoder 4 is controlled in accordance with Remain-bit-GOP, in the transition region between splice and VBV_lock so that the occupancy of the downstream buffer 8 follows a continuous but changing trajectory from before the splice at bitstream A occupancy to VBV_lock at the bitstream B occupancy. The control is also used to force the complexity and virtual buffers as described above.

In order to increase occupancy of the downstream buffer as shown in FIG. 8, the buffer in the encoder is controlled to output pictures with smaller number of bits, so that its occupancy decreases. Pictures with smaller numbers of bits are produced by increased compression/coarser quantisation.

If the trajectory is from high occupancy of the downstream buffer to lower occupancy of the downstream buffer, the encoder is controlled in accordance with the higher Remain-bit-GOP to increase occupancy of its buffer, producing larger pictures by less compression/finer quantisation.

Various modifications may be made to the first method. The VBV values of a bitstream, e.g. stream B tend to maintain roughly constant peak values. Thus instead of finding the peak VBV of stream B at the predicted lock point VBV_lock, the VBV value of stream B at the I frame closest to the splice point could be used as a prediction of occupancy at VBV_lock.

The value can be adjusted periodically through the GOP.

Second Method (short latency)

The second method modifies the first method as follows:

The second method uses the picture decision rules (1) to (4) above but with the following modification:

Rule (1) is changed to (1') The last '$I_0$' or '$P_0$' frame of the bitstream ($A_f$) before the splice is converted to 'P'.

Complexity and Virtual Buffers Modification are dealt within the same way as in the first method.

Adjust Remain_bit_GOP.

In order to increase occupancy of the downstream buffer as shown in FIG. 6, the buffer in the encoder is controlled in accordance with Remain_bit_GOP to output pictures with smaller number of bits, so that its occupancy decreases. Pictures with smaller numbers of bits are produced by increased compression/coarser quantisation.

If the trajectory is from high occupancy of the downstream buffer to lower occupancy of the downstream buffer, the encoder is controlled in accordance with the higher Remain-bit-GOP to increase occupancy of its buffer, producing larger pictures by less compression/finer quantisation.

Remain-bit-GOP is the target for the number of bits remaining in the GOP.

The length of the transitional GOP is known from the result of adjusting the GOP length using the picture decision rules.

The value of the Remain-bit-GOP is reset to zero at the splice point. The value of Remain-bit-GOP is recalculated in normal manner for the new transitional. GOP following the splice point. The value of Remain-bit-GOP at the splice is changed by a value VBV_diff where $$VBV\_diff=VBV\_C\_splice-VBV\_B\_next\ I\ or\ P.$$

That is, the Remain_bit_GOP is initially set to the sum of [the normal allocation of bits for the GOP ] and [the difference between (the VBV value of stream C at the splice) and (the VBV value at the first I or P frame following the splice of the stream B)]. This is a prediction of the VBV of the bitstream B at the VBV_lock point. The value of Remain_bit_GOP is then reduced by a factor $\alpha<1$, for the transitional GOP.

The factor reduces Remain_bit_GOP for the transitional GOP by an empirically determined amount e.g. 5% or less. It is assumed herein that $\alpha$ is fixed. It may be varied.

Remain_bit_GOP is updated at every frame by the number of bits used to encode that frame. In addition the following updating occurs.

At the splice point VBV_diff is based on VBV_C_splice$-$VBV$_{13}$ B_next I or P. Subsequently at every succeeding I and P frame of the stream B, VBV_Diff=VBV_B_current_I or P$-$VBV_B_next I or P. If VBV-diff is positive the change is divided by the number of I and P frames in the remainder of the transitional GOP and the result added to Remain_Bit_GOP at each subsequent update. If VBV_diff is negative Remain_bit$_1$ GOP is reduced by VBV_diff. In stream C of FIGS. 6 and 7 Remain-bit-GOP is thus updated every 3 frames. This continues until VBV_lock is achieved.

The initial value of Remain-bit GOP is reduced by the factor $\alpha$. $\alpha$ is chosen to reduce the value of Remain-bit-GOP so that spare bits are available at VBV_lock. The spare bits allow additional bits ("stuffing bits") to be added to achieve exact lock. The need for this will be explained hereinbelow.

The differences VBV_diff can be calculated because the frames are stored.

The discussion hereinabove of the first and second methods assumes VBV_lock will be achieved at the end of the first transistional GOP after the splice point. VBV_lock may not occur in the event of extreme differences between the two bitstreams. In the second method, the value of Remain_bit_GOP is updated every 3 frames on an I or P frame and the process of trying to achieve VBV_lock progresses until lock is achieved.

Third Method (Reduction Limits)

A third method discussed next aims to reduce that problem. It also allows the automatic determination of whether to extend the transitional region between the bitstreams A and B. The third method modifies the second method in the way that Remain_Bit_GOP is controlled. It uses the picture decision rules of the second method and deals with complexity and virtual buffers modification in the same way as the first method.

Figure 10A:
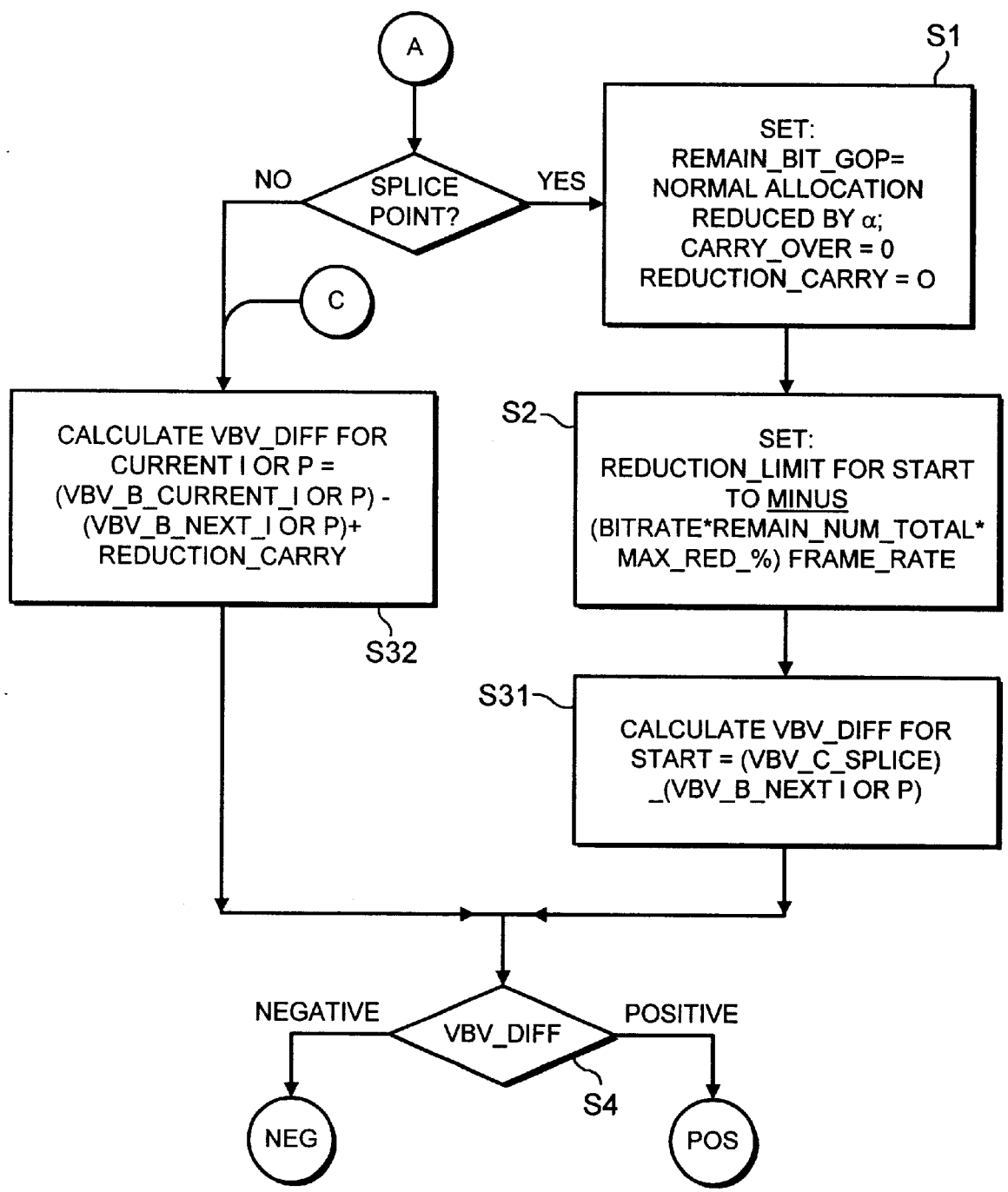
FIGS. 10A, B and C are a flow chart illustrating the manner in which occupancy is controlled in the transition region in a further embodiment of the invention.
Figure 10B:
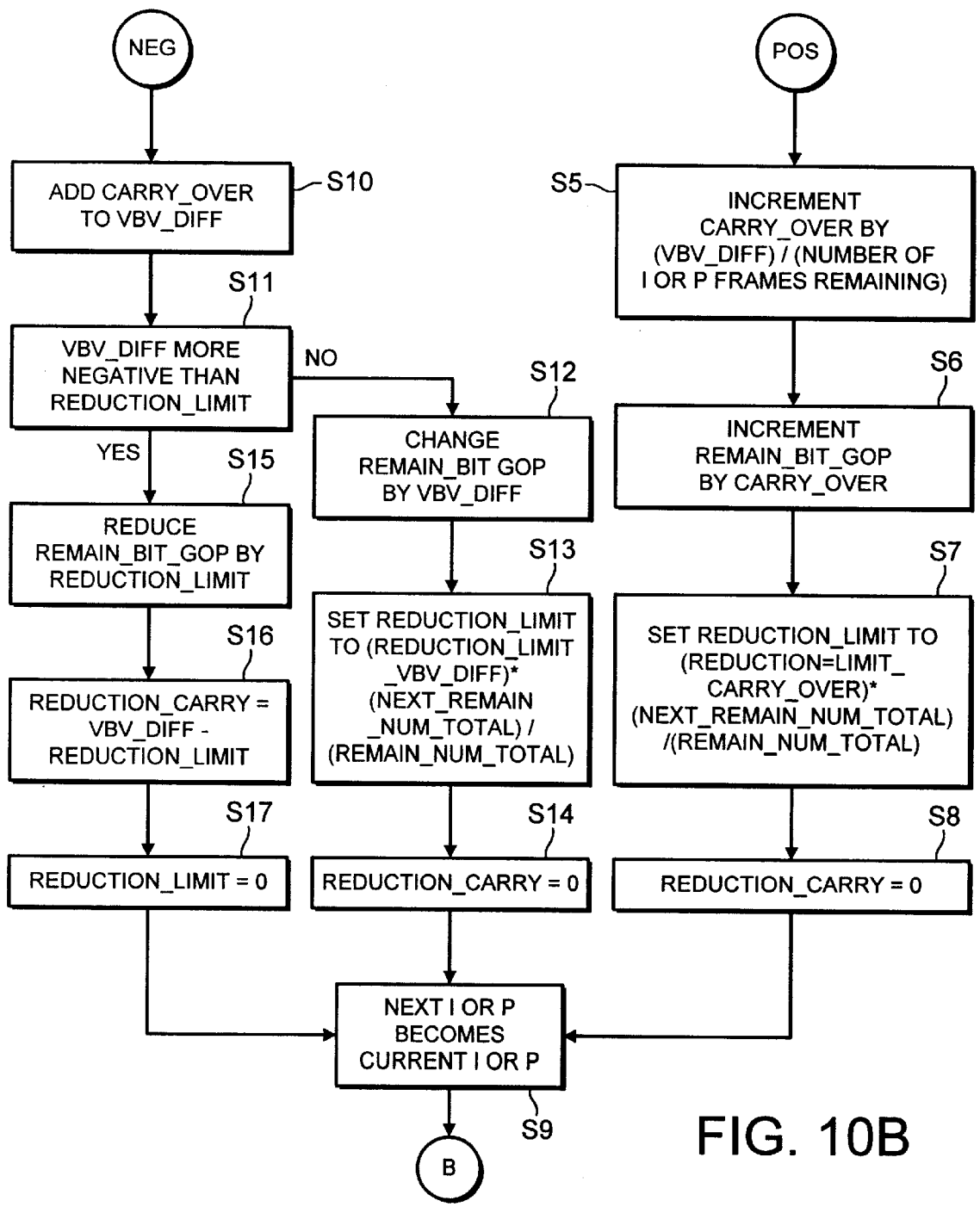
Figure 10C:
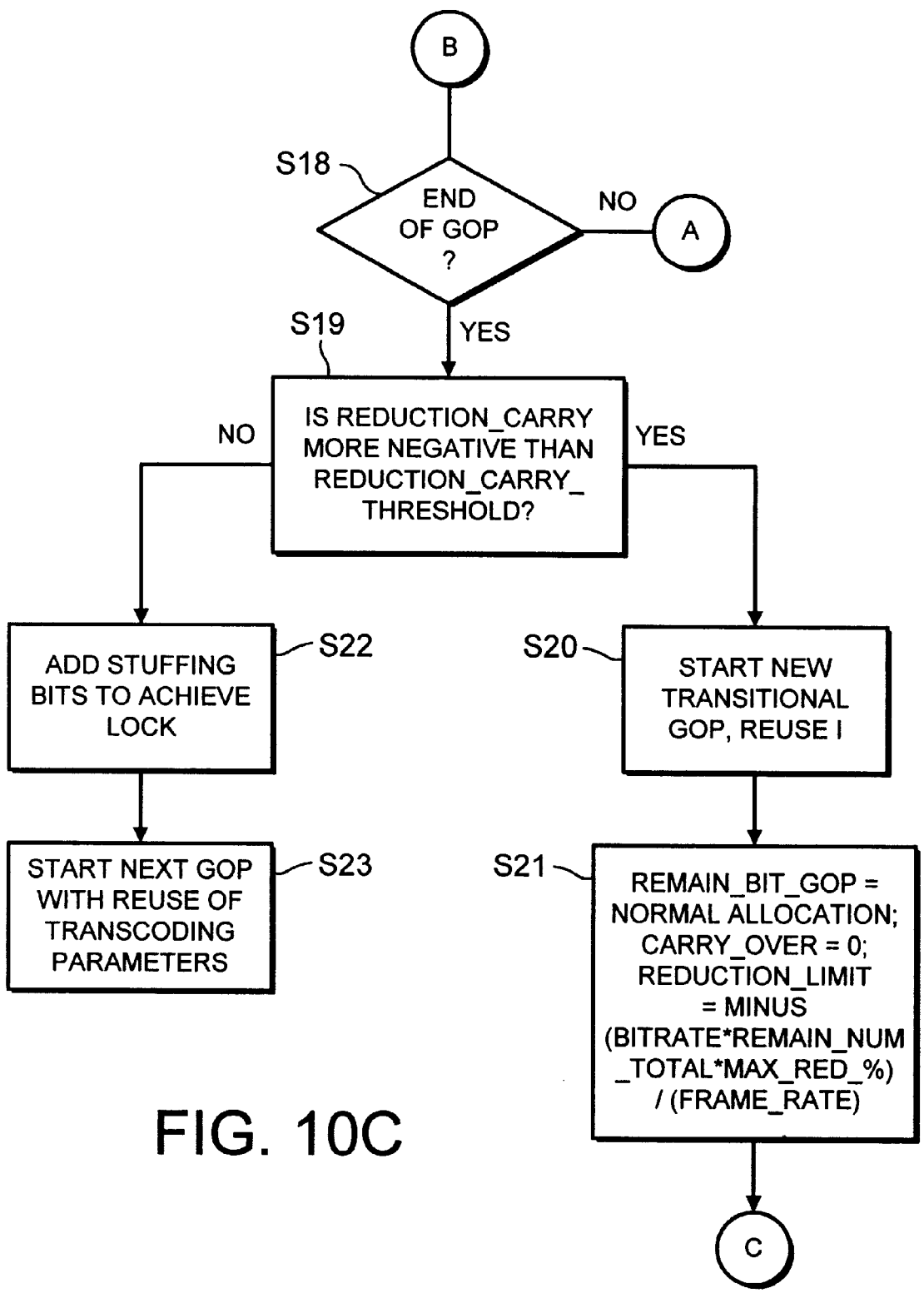

Remain_bit_GOP is updated on every frame by the number of bits used to encode that frame as is normal in MPEG2. In addition referring to FIGS. 10A, B and C, it is updated at the start of the transitional GOP and on every I or P frame therein as described with reference to FIGS. 10A to C.

d) Adjust Remain_bit_GOP.

In order to increase occupancy of the downstream buffer as shown in FIG. 9, the buffer in the encoder is controlled in accordance with Remain_bit_GOP to output pictures with smaller numbers of bits, so that its occupancy decreases. Pictures with smaller numbers of bits are produced by increased compression/coarser quantisation.

If the trajectory is from high occupancy of the downstream buffer to lower occupancy of the downstream buffer, the encoder is controlled in accordance with the higher Remain_bit_GOP to increase occupancy of its buffer, producing larger pictures by less compression/finer quantisation.

Remain_bit_GOP is the target for the number of bits remaining in the GOP.

The length of the transitional GOP is known from the result of adjusting the GOP length using the picture decision rules (1) to (4) above.

Remain_bit_GOP is adjusted in the following way. It is reduced after every frame by the number of bits used to encode that frame as is normal in MPEG2. In addition referring to FIGS. 10A, B and C, it is updated at the start of the transitional GOP and on every I or P frame therein as described with reference to FIGS. 10A to C.

At the splice point, Remain_bit_GOP is set to the normal allocation of bits for the transitional GOP defined by the picture decision rules, the allocation being preferably reduced by the factor $\alpha$, a variable carry_over is set to zero and a variable reduction_carry is set to zero. [Step S1]. ( Carry_over is a positive value of VBV_diff averaged over the remaining I and P frames of the GOP and reduction_carry is the excess of VBV_diff over the reduction_limit)

A variable Reduction_limit is initially set to minus (bitrate*remain_num_total*max_red_% )/ (frame_rate)

where remain_num_total is the number of frames remaining in the GOP, and max_red_% is a number chosen empirically representing the desired maximum reduction in bit rate allowed during the transitional GOP. [StepS2]. Reduction_limit represents the maximum amount by which the bit rate may be reduced at any update on an I or P frame.

VBV_diff for the start of the transitional GOP is calculated as (VBV_C_splice)-(VBV_B_next_I or P)

i.e. as the difference between the VBV value of bit stream C at the splice point and the VBV value of the bitstream B at the immediately following I or P frame. [Step S31].

It is to be appreciated that reduction_limit is a negative number in this example. Also steps S1 , S2 and S31 set up initial values used only at the start of the transitional GOP.

Referring to step S4, step S4 determines whether the initial value of VBV_diff at the start of the GOP is positive or negative as calculated by step S31. If the update is taking place on an I or P frame not at the start of the GOP then VBV_diff is calculated by step S32 as VBV_diff=(VBV_B_Current I or P)-(VBV_B_next I or P)+reduction_carry.

That is VBV_diff is updated by the difference between the current VBV value of the bitstream B and the next VBV_value (on an I or P frame) plus any reduction_carry.

Updates then take place in the following way which applies equally to the start of the GOP and to subsequent updates on an I or P frame.

VBV_diff positive at Step S4. (See FIG. 10B)

If VBV_diff is positive, then step S5 increments the variable carry_over by (VBV_diff)/(number of I or P frames remaining in the GOP) and step S6 increments Remain_bit_GOP by carry_over. Thus steps S5 and S6 average positive values of VBV_diff over the remaining I and P frames in the GOP. On each occasion there is a positive VBV_diff Remain_bit_GOP is incremented by carry_over.

Step S7 sets reduction_limit to:

(Reduction_limit-carry_over)*(next_remain_num_total)/(remain_num_total)

where next_remain_num_total is the number of frames remaining in the GOP at the next update (at an I or P frame) including the next I or P frame and remain_num_total is the number of frames remaining in the GOP including the current frame. That is the negative value reduction_limit is increased by carry_over because the positive change in Remain_bit_GOP allows a bigger change in VBV at a subsequent update.

Step S8 sets reduction_carry to zero: reduction_carry is recalculated at each update on an I or P frame to avoid accumulation of its values.

VBV_diff negative at Step S4. (See FIG. 10B).

If VBV_diff is negative at step S4, then at step S10, the variable carry_over (which is the cumulative averaged positive value of VBV_diff from previous updates calculated at step S5) is added to VBV_diff to produce a new value of VBV_diff. That is carry_over is added to VBV_diff to make it less negative thus allowing a correspondingly bigger change to occur in Remain_bit_GOP because more bits are available. The result as tested at step S11 is that the new value of VBV_diff may be more or less negative than reduction_limit which is the maximum change allowed in Remain_bit_GOP.

If the new value of VBV_diff is more negative than reduction_limit then Remain_bit_GOP is reduced by reduction_limit [step S15]. Reduction_carry is calculated at step S16 as the excess of the new value of VBV_diff over the reduction_limit. Once reduction_limit has been exceeded in the GOP it is set to zero at step S17.

If the new value of VBV_diff is less negative than reduction_limit then at step S12 Remain_bit_GOP is changed by the value of VBV_diff. It will be appreciated that the new value of VBV_diff could be positive or negative in this case. If VBV_diff is positive Remain_bit_GOP is increased by VBV_diff and if VBV_Diff is negative Remain_bit_GOP is reduced by VBV_diff.

At step S13, the reduction_limit is set to:

(reduction_limit_-VBV_diff)*(next_remain_num_total)/(remain_num_total)

where next_remain_num_total and remain_num_total are as defined for step S7. That is reduction_limit is:

reduced (i.e. made less negative) as the GOP progresses if VBV_diff is negative because fewer bits are available in the GOP; and (subject to the scaling effect of (next_remain_num_total)/(remain_num_total) increased (i.e. made more negative) if VBV_diff is positive because more bits are available in the GOP.

Reduction_carry is set to zero at step S14 for the same reason as at step S8.

The algorithm then proceeds to the next I or P update at step S9. If at step S18 the end of the transitional GOP as determined by the picture decision rules has not occurred then the procedure returns to step S32 and repeats until the end of the transitional GOP.

At the end of the GOP, step S19 determines whether reduction carry is more negative than a threshold value reduction_carry_threshold. It will be appreciated that this will occur only if VBV_diff is more negative (after any positive offsetting by the cumulative value carry_over) than reduction_limit.

Reduction_carry less negative than the threshold indicates that VBV_lock can be achieved using stuffing bits as at step S22. The next GOP is then started with reuse of the transcoding parameters to maintain picture quality.

Reduction_carry more negative than the threshold indicates that VBV_lock has not been achieved and a new transitional GOP is started but with reuse of the I frame transcoding parameters and recoding of P and B frames.

[Step S20]. For the new transitional GOP the following variables are set to initial values at the start of the GOP:

Remain_bit_GOP is set to its normal allocation. The length of the GOP is not determined by the picture decision rules but is determined as the normal length for a GOP. Carry_over is set to zero. Reduction_limit is set to minus (bitrate*remain_num_total*max_red_%)/(frame_rate).

The value of reduction_carry from the previous GOP is carried over to the new GOP.

The procedure of updating Remain_bit GOP of steps S32 and S4 to S18 starts again until the occupancy of the transitional GOP equals that of the bitstream B. Preferably, the new transitional GOP reuses transcoding parameters for its I frames.

In one version, the threshold is set at zero. If reduction_carry is zero, the transitional GOP ends because VBV_lock is deemed to have occurred. If reduction_carry is not zero, full recoding continues in another GOP, which is a normal long GOP but according to the procedure of FIG. 10 until VBV_lock is achieved..

In another version, the threshold is set to a value K %. If reduction_carry is less than K then any difference between the VBVs of the transitional GOP and the bitstream B are small and are made up with stuffing bits. The spare stuffing bits are from the allocation of spare bits provided by reducing the normal allocation for Remain_bit_GOP by the factor a at the beginning of the GOP. The threshold K % is of the normal bit allocation for a long GOP. K may be in the range 0% to 8%, preferably about 5%. The maximum_reduction_percentage may be 25%.

The application of the reduction_limit ensures that during the transitional GOP the bit rate does not go below a predetermined minimum rate or equivalently the rate of change of occupancy does not exceed a predetermined maximum rate. Dividing positive changes in Remain_bit_GOP over the remainder of the I and P frames in the GOP tends to even out the changes in Remain_bit_GOP over the GOP. If VBV_diff is negative, but does not exceed the reduction limit, the limit is progressively reduced as the GOP proceeds. Thus the maximum change allowed reduces preventing disproportionately large changes in Remain_bit GOP at the end of the GOP. The method of FIG. 10 allows the transtion region beginning just before splice and ending at VBV_lock to be varied in length as necessary (as determined by reduction_limit) so as to efficiently achieve VBV_lock.

VBV_Lock point—Applies to the first, second and third methods

The period over which VBV_lock is predicted to be achieved is one (or more) GOP albeit a GOP the length of which may have been changed by the picture type decision rules. In this example it is about 30 frames.

Referring to FIGS. 2, 3, 4, 5 and 6, assume lock is achieved at I-frame 52 in display order (FIG. 4). In fact the VBV lock is achieved in the processing order so that it occurs at reordered I frame 50 (FIG. 5). The following B frames 51 and 52 in FIG. 5 are fully recoded frames from prior to VBV_lock and disturb the lock. Thus the spare bits are used at the second B frame 52 to stuff the bitstream to achieve exact lock.

If the factor α is zero, then no spare bits are available so the system attempts to achieve exact lock at the I frame immediately after the end of the transitional GOP. Rate control under or over steers producing usually too many bits. Even if exact lock is achieved, at the I frame, lock is disturbed at the B frames. So, Remain_bit-GOP is reduced by the factor α so rate control oversteers so that spare bits are available at the end of the GOP. The spare bits are used to achieve exact lock at the second B frame.

The I-frame 50 is processed by reusing its parameters derived from the original bitstream $B_0$. After the fully recoded B frames 51 and 52, re-use of parameters resumes.

This applies to the first and second and third methods.

Various modifications may be made to the first and second methods:

In the first method, within the transitional GOP after the splice point, lock is achieved with the appropriate value of α. α is chosen so that lock is achieved except for the extreme case. α may be variable.

The picture type decision rule (4) may be changed to be ($4_I$):

($4_I$) If the first GOP after the splice contains only one 'P' frame, the frame types of the next GOP are altered from 'I' to 'P' and 'P' to 'I' to give two 'P' frames in a GOP.

This results in two shorter GOPs between the splice point and VBV_lock.

In this case Extra_bits is divided between the two GOPs in suitable proportions.

Motion Vectors

Motion vectors for the frames of the transitional GOP may be generated by full recoding, or may be estimated from vectors in neighbouring frames.

Bit growth on frames outside transition region

The VBV of the recoded frames are only approximately the same as their original forms because the number of bits may shrink or grow in the course of decoding and recoding.

The frames outside the transition region are originally encoded as long GOPs, decoded to baseband recoded as I frames, decoded to baseband and recoded as log GOPs. In these processes, the transcoding parameters of the original encoding are re-used to maintain maximum quality. However the DCT and inverse DCT (IDCT) processes are not transparent, i.e. errors occur. In addition, the original baseband is not the same as the decoded I frames due to quantization effects. As a result the number of bits in the frames can shrink or grow. If the shrinkage or growth is large enough the buffers may over- or under-flow. Thus, the frames are monitored.

If excessive shrinkage occurs bit stuffing is used. If excessive growth occurs; frames are recoded. The bit stuffing and recoding is used to maintain occupancy within normal MPEG2 limits. Preferably recoding reuses the transcoding parameters of the I frames to maintain picture quality.

To maintain picture quality, the transcoding parameters of the I frames of the bitstream $B_0$ may be reused when re-encoding those frames in the transitional GOP.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A signal processor for splicing a compressed video bitstream $A_0$ to a compressed video bitstream $B_0$ to form at compressed bitstream C, the bitstreams $A_0$, $B_0$ and C having GOPs including I frames and P and/or B frames, the processing comprising first and second inputs ($A_0$, $B_0$) for receiving the bitstreams $A_0$ and $B_0$ respectively, first means (1, 8; 3, 10) for re-encoding the GOPs of the bitstreams $A_0$ and $B_0$, re-encoded bitstreams $A_I$ and $B_I$ respectively having GOPs including only I frames, the transcoding parameters of the frames of the bitstreams $A_0$ and $B_0$ being retained unchanged in association with the corresponding I frames of the bitstreams $A_I$ and $B_I$, means (141, 142, 51, 12) for splicing bitstream $B_I$, to bitstream $A_I$ at a splice point (SPLICE), to produce a spliced I-frame bitstream, ( $A_I/B_I$)

second means (14) for re-encoding the spliced I-frame bitstream ( $A_I/B_I$) as the compressed bitstream for supply to a downstream decoder (2) having a downstream buffer wherein the value of occupancy of the downstream buffer by the bitstream C is controlled over a transition region having a transitional GOP including the splice point (SPLICE) so that the said value of occupancy changes over the duration of the transition region from that of stream $A_0$ to that of stream $B_0$, and wherein the frames of the bitstream $A_I$ before the transition region are re-encoded re-using the transcoding parameters of the corresponding frames of the bitstream $A_0$, and the frames of the bitstream $B_I$ after the transition region are re-encoded re-using the transcoding parameters of the corresponding frames of the bitstreams $B_0$.

2. A processor according to claim 1, wherein the said transcoding parameters reused for I frames are Q, DCT_type, and Q-matrix.

3. A processor according to claim 1, wherein I frames of the bitstream $A_0$ or $B_0$ are re-encoded by the first re-encoding means as I frames in the bitstream $A_I$ or $B_I$ and having the same transcoding parameters in bitstream $A_I$ or $B_I$ as in bitstream $A_0$ or $B_0$.

4. A processor according to claim 1, wherein the I frames of the bitstream $A_0$ or $B_0$ are reused without decoding by the first re-encoding means as I frames of the bitstream $A_I$ or $B_I$.

5. A processor according to claim 1, wherein I frames of the bitstream $A_0$ or $B_0$, before and after the transition region, are re-encoded by the second re-encoding means, as I frames having the same transcoding parameters in bitstream C as in bitstream $A_0$ or $B_0$.

6. A processor according to claim 1, wherein P and B frames of the bitstreams $A_0$ and $B_0$ before and after the transition region, are re-encoded by the second re-encoding means, as P and B frames respectively having the same transcoding parameters in bitstream C as in bitstreams $A_0$ and $B_0$.

7. A processor according to claim 1, wherein the value of occupancy for bitstream C is controlled between the splice point in accordance with the difference between the occupancy value for stream $A_0$ immediately before the splice point and a prediction of the occupancy value of bitstream C at the end of the transition region.

8. A processor according to claim 7, wherein in the transition region, a portion of the transitional GOP in bitstream C is produced by modifying the frames of bitstream $B_I$. corresponding to bitstream $B_0$ following the splice point so that, referring to the frames and GOPs of the bitstream $B_0$,
  a) the first $I_0$ or $P_0$ frame after the splice point is converted to I; and
  b) if the GOP resulting from a) after the splice point contains less than 3 frames, the first $I_0$ frame of the next GOP is converted to P.

9. A processor according to claim 7, wherein a portion of the transitional GOP of bitstream C is produced by modifying the frames of bitstream $B_I$. corresponding to bitstream $B_0$ following the splice point, so that, referring to the frames and GOPs of the bitstream $B_0$, if the first GOP after the splice contains only one 'P' frame, the frame types of the next GOP are altered from 'I' to 'P' and 'P' to 'I'.

10. A processor according to claim 8, wherein in the transition region, a portion of the transitional GOP of bitstream C is produced by modifying the frames of bitstream $A_I$ corresponding to bitstream $A_0$ before the splice point so that, referring to the frames of the GOP of the bitstream $A_0$ immediately before the splice point,
  c) at least the last $I_0$ or $P_0$ frame of bitstream $A_0$ before the splice point is converted to P, and
  d) if the last frame before the splice point of bitstream $A_0$ is a B frame it is converted to P.

11. A processor according to claim 10, wherein c) the two $I_0$ or P0 frames of bitstream $A_0$ before the splice point are converted to P.

12. A processor according to claim 7, wherein the second encoding means calculates for the transitional GOP an initial value for the target number of bits (Remain-bit-GOP) for the GOP, and controls the value of occupancy for bitstream C within the transitional GOP in dependence upon Remain-bit-GOP.

13. A processor according to claim 12, wherein the initial value of Remain-bit-GOP is calculated as the sum of;
  a) the difference between the values of occupancy for stream C at the splice point and the prediction of the occupancy at the end of the transition region; and
  b) the number of bits calculated for the GOP as if the difference (a) was zero.

14. A processor according to claim 7, wherein said prediction of the occupancy value of stream C at the end of the transition region is the occupancy value of stream B at the predicted position.

15. A processor according to claim 7, wherein the said prediction of the occupancy value of stream C at the end of the transition region is the peak occupancy value of stream $B_0$ at a point adjacent to the splice point.

16. A processor according to claim 12, wherein the initial value of Remain-bit-GOP is calculated as the sum of
  a) the difference between the occupancy value of stream C at the splice and the occupancy value of the nearest I or P frame of stream $B_0$ following the splice; and
  b) the number of bits calculated for the GOP as if the difference a) was zero.

17. A processor according to claim 16, wherein, referring to the frames of bitstream $B_0$,
  Remain-bit-GOP is subsequently changed at every $I_0$ and $P_0$ frame by the difference between
    a) the occupancy value of stream B at the current I or P frame;
    b) the occupancy value of stream B at the succeeding I or P frame.

18. A processor according to claim 12, wherein the initial value of Remain-bit-GOP is reduced by a predetermined percentage.

19. A processor according to claim 18, wherein additional bits are added to the stream C after the position at which the occupancy value for stream C approximately equals that for stream B to achieve equality.

20. A processor according to claim 17 wherein any reduction in Remain_bit_GOP is limited to a limit value.

21. A processor according to claim 20, wherein the limit value reduces as the transitional GOP progresses.

22. A processor according to claim 20, wherein if at the end of the transitional GOP of bitstream C the excess of the reduction in Remain_bit_GOP over the limit value (reduction_carry) exceeds a preset value, then, referring to the frames of bitstream $B_0$, Remain_bit_GOP is changed at every $I_0$ and $P_0$ frame of the next GOP of the bitstream $B_0$ and the frames of the bitstream $B_0$ are recoded by the second encoding means $B_0$ until reduction_carry is less than or equal to the preset value.

23. A processor according to claim 22, wherein the preset value is zero.

24. A processor according to claim 23, wherein the preset value is a preset percentage of Normal_GOP_bit_allocation as defined herein.

25. A processor according to claim 22, wherein the transcoding parameters of the I frames of the bitstream $B_0$ are reused when re-encoding those frames in the said next GOP.

26. A processor according to claim 1, wherein the transcoding parameters of the I frames of the bitstream $B_0$ are reused when re-encoding those frames in the said transitional GOP.

* * * * *